United States Patent
Modi et al.

(10) Patent No.: US 9,830,785 B2
(45) Date of Patent: Nov. 28, 2017

(54) GUIDED INSTALLATION FOR AN OPENING SENSOR

(71) Applicant: Google Inc., Mountain View, CA (US)

(72) Inventors: Yash Modi, San Mateo, CA (US); Lawrence Au, Sunnyvale, CA (US); Kevin Charles Peterson, San Francisco, CA (US); Shao-Po Ma, Taipei (TW)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/355,646

(22) Filed: Nov. 18, 2016

(65) Prior Publication Data

US 2017/0069183 A1   Mar. 9, 2017

Related U.S. Application Data

(63) Continuation of application No. 14/585,500, filed on Dec. 30, 2014, now Pat. No. 9,523,567.

(51) Int. Cl.
  *G08B 13/08* (2006.01)
  *G01B 7/14* (2006.01)
  *G08B 5/36* (2006.01)

(52) U.S. Cl.
  CPC ............ *G08B 13/08* (2013.01); *G01B 7/14* (2013.01); *G08B 5/36* (2013.01)

(58) Field of Classification Search
  CPC ............ G01B 7/14; G08B 5/36; G08B 13/08
  USPC ............................................ 340/815.45, 547
  See application file for complete search history.

(56) References Cited

U.S. PATENT DOCUMENTS

| | | |
|---|---|---|
| 4,553,134 A | 11/1985 | Holt |
| 6,472,993 B1 | 10/2002 | Addy |
| 7,471,242 B2 | 12/2008 | Kolavennu et al. |
| 2004/0032326 A1 | 2/2004 | Nakamura et al. |
| 2008/0001598 A1 | 1/2008 | Koivuaho |
| 2008/0157964 A1 | 7/2008 | Eskildsen et al. |
| 2009/0058663 A1 | 3/2009 | Joshi et al. |
| 2012/0066707 A1 | 3/2012 | Poder et al. |
| 2013/0265162 A1 | 10/2013 | Buckley et al. |

(Continued)

FOREIGN PATENT DOCUMENTS

| | | |
|---|---|---|
| EP | 2650848 A2 | 10/2013 |
| EP | 2711905 A2 | 3/2014 |

OTHER PUBLICATIONS

Deng, et al., "The Design of Burglar Alarm Circuit Based on the Magnetic Field Sensor", Computing, Measurement Control and Sensor Network (CMCSN), 2012 International Conference on, IEEE, Jul. 7, 2012, pp. 199-200.

(Continued)

*Primary Examiner* — Juan A Torres
(74) *Attorney, Agent, or Firm* — Morris & Kamlay LLP

(57) ABSTRACT

Systems and techniques are provided for guided installation of an opening sensor. A strength of a magnetic field created by a magnet of an opening sensor at a location of a magnetometer sensor of the opening sensor may be determined. Feedback may be provided to an installer of the opening sensor based on the determined strength of the magnetic field. A function of the opening sensor may be configured based on the determined strength of the magnetic field. The function may be associated with reporting the status of an entry point to which the magnetometer sensor may be affixed.

20 Claims, 9 Drawing Sheets

(56) References Cited

U.S. PATENT DOCUMENTS

2014/0266177 A1    9/2014  Wisniewski et al.

OTHER PUBLICATIONS

PCT/US2015/067636, International Search Report and Written Opinion issued in PCT/US2015/067636 dated Apr. 4, 2016, Apr. 4, 2016, p. 13.
IPRP dated Jul. 13, 2017 as received in Application No. PCT/US2015/067636.

GUIDED INSTALLATION FOR AN OPENING SENSOR

CROSS-REFERENCE TO RELATED APPLICATIONS

The present Application for Patent is a continuation of U.S. Non-Provisional patent application Ser. No. 14/585,500, entitled "GUIDED INSTALLATION FOR AN OPENING SENSOR," filed Dec. 30, 2014, assigned to the assignee hereof, and expressly incorporated herein by reference in its entirety.

BACKGROUND

A sensor with a magnet and magnetometer may be used to provide an indication of whether an entry point is open or closed. The status of the entry point reported by the sensor may be used when determining what mode a security system can be put in, or whether or an alarm should generated. For example, a security system in an armed state that receives a signal from the sensor indicating that the entry point has been opened may generate alarm, as the opening of the entry point may indicate an attempted intrusion.

The magnet and magnetometer of the sensor may be separate physical components, and may need to be installed on an entry point in a specific configuration in order for the sensor to function properly. For example, a magnet may be installed on a door frame while the magnetometer is installed on the door, with minimum and maximum distances between the install points for each physical component. If the magnet and magnetometer are not aligned correctly, or placed so that they are too close together or too far apart when the entry point is in a closed position, the sensor may not correctly detect the position of the entry point. This may result in an open entry point being detected by the sensor as closed or a closed entry point being detected by the sensor as open. Improper installation of the magnet and magnetometer may render the sensor less useful to a security system.

BRIEF SUMMARY

According to an implementation of the disclosed subject matter, a strength of a magnetic field created by a magnet of an opening sensor at a location of a magnetometer sensor of the opening sensor may be determined. Feedback may be provided to an installer of the opening sensor based on the determined strength of the magnetic field. A function of the opening sensor may be configured based on the determined strength of the magnetic field. The function may be associated with reporting the status of an entry point to which the magnetometer sensor may be affixed.

A relative distance between the magnetometer sensor and the magnet may be determined based on the strength of the magnetic field. The magnet may be in one of a number of zones relative to the magnetometer sensor. The zones may include a first zone between the magnetometer sensor and a first threshold, a second zone between the first threshold and a second threshold farther from the magnetometer sensor than the first threshold, a third zone between the second threshold and a third threshold farther from the magnetometer sensor than the second threshold, and a fourth zone beyond the third threshold and extending away from the magnetometer sensor.

The feedback device may include an LED. To provide feedback based on the determined strength of the magnetic field, the LED may be caused to provide a first indication when the magnet in the first zone, the LED may be caused to provide a second indication when the magnet is the second zone, the LED may be caused to provide a third indication when the magnet in the third zone, and the LED may be caused to provide a fourth indication when the magnet is in the fourth zone. The first indication may include blinking yellow, the second indication may include showing solid green, the third indication may include showing solid yellow, and the fourth indication may include showing solid red.

To configure the function of the opening sensor based on the determined strength of the magnetic field, reporting a partial opening of an entry point when the magnet is in the first zone may be enabled and reporting a partial opening of the entry point when the magnet is in the second zone may be enabled. To configure the function of the opening sensor based on the determined strength of the magnetic field, reporting a partial opening of the entry point when the magnet is in the third zone may be disabled, reporting any opening of the entry point when the magnet is in the fourth zone may be disabled.

The magnetometer sensor may include a magnetometer for detecting the magnetic field from the magnet. The magnetometer may be a compass. To determine the strength of the magnetic field created by the magnet, detected magnetic field strength may be adjusted based on the geomagnetic field.

The feedback provided may be changed when the determined strength of the magnetic field from the magnet changes due to a change in a relative distance between the magnet and the magnetometer.

According to an implementation of the disclosed subject matter, a magnet may include a permanent magnet in a housing. A magnetometer sensor may include a magnetometer, a processor, and a feedback device in a second housing. The processor may determine a strength of a magnetic field created by the magnet at a location of the magnetometer sensor, cause the feedback device to provide feedback based on the determined strength of the magnetic field, and enable and disable functionality of the magnetometer sensor based on the determined strength of the magnetic field.

The magnet may be affixed to a stationary portion of an entry point and the magnetometer sensor may be affixed to a moving portion of an entry point. The magnet may be in one of a number of zones relative to the magnetometer sensor. The zones may include a first zone between the magnetometer sensor and a first threshold, a second zone between the first threshold and a second threshold farther from the magnetometer sensor than the first threshold, a third zone between the second threshold and a third threshold farther from the magnetometer sensor than the second threshold, and a fourth zone beyond the fourth threshold and extending away from the magnetometer sensor.

The feedback device may provide a first indication when the magnet in the first zone, may provide a second indication when the magnet is the second zone, nay provide a third indication when the magnet in the third zone, and may provide a fourth indication when the magnet is in the fourth zone. The feedback device may include an LED that may blink yellow to provide the first indication, show solid green to provide the second indication, show solid yellow to provide the third indication, and show solid red to provide the fourth indication.

The processor may enable reporting partial opening of an entry point when the magnet is in the first zone, may enable reporting partial opening of the entry point when the magnet is in the second zone, may disable, reporting partial opening of the entry point when the magnet is in the third zone, and may disable reporting any opening of the entry point when the magnet is in the fourth zone.

According to an embodiment of the disclosed subject matter, a means for determining a strength of a magnetic field created by a magnet of an opening sensor at a location of a magnetometer sensor of the opening sensor, a means for providing feedback to an installer of the opening sensor based on the determined strength of the magnetic field, a means for configuring a function of the opening sensor based on the determined strength of the magnetic field, where the function is associated with reporting the status of an entry point to which the magnetometer sensor is affixed, a means for determining a relative distance between the magnetometer sensor and the magnet based on the strength of the magnetic field, a means for causing the LED to provide a first indication when the magnet in the first zone, a means for causing the LED to provide a second indication when the magnet is the second zone, a means for causing the LED to provide a third indication when the magnet in the third zone, a means for causing the LED to provide a fourth indication when the magnet is in the fourth zone, a means for enabling reporting a partial opening of an entry point when the magnet is in the first zone, a means for enabling reporting a partial opening of the entry point when the magnet is in the second zone, a means for disabling reporting a partial opening of the entry point when the magnet is in the third zone, a means for disabling reporting any opening of the entry point when the magnet is in the fourth zone, a means for adjusting a detected magnetic field strength based on the geomagnetic field, are included Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 4 shows an example of installation positions using guided installation of an opening sensor according to an implementation of the disclosed subject matter.

DETAILED DESCRIPTION

Figure 1:
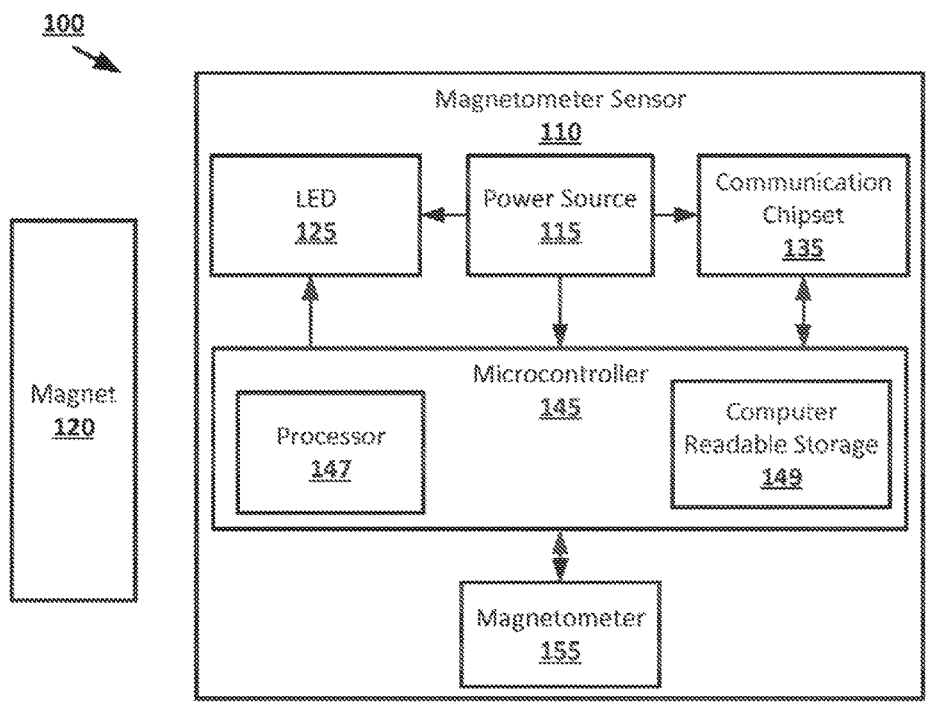
FIG. 1 shows an example system suitable for guided installation of an opening sensor according to an implementation of the disclosed subject matter.

According to embodiments disclosed herein, guided installation for an opening sensor may allow for the installation of a sensor package that may be utilized to determine the amount by which a door or window may be open or ajar as part of an intelligent security system. The sensor may include a magnetometer sensor and a magnet. The magnetometer sensor may include a magnetometer, such as a compass, which may provide an indication corresponding to the geomagnetic field and may also provide an indication that a second magnetic field is proximal to an entry point, such as a door or window of a home. For example, the compass may provide analog data that can be received by a processor. The processor may determine that the compass readings are anomalous due to the presence of a second magnetic field as compared to when there was only a single magnetic field. The compass may determine that there's an increase in magnetic field strength and/or that there is an orientation change in the field. For example, the compass may have historically detected a single magnetic field in one spot, but it may subsequently detect the presence of a second magnetic field in a different direction from the first magnetic field. Thus, the compass may be able to determine the orientation or orientation change from a reference point of an object with which it is associated, such as a door. The opening sensor may be installed on various other entry points, such as a window that slides between an open state and a closed state. The use of a compass in combination with the accelerometer data may indicate proximity to the closed position and/or the presence of a second magnetic field. In order for the magnetometer to function properly, the magnetometer sensor may need to be installed at a particular distance from the magnet. The magnetometer may include a feedback device, such as an LED, which may be used to provide guided installation feedback during the installation of the magnetometer and the magnet. The distance of the magnet from the magnetometer sensor may be divided into zones relative to the magnetometer, and the feedback device may provide different indicators depending on which zone the magnet is in. This feedback may be used by a person installing the opening sensor to adjust the position of the magnet, until the magnet is an appropriate distance from the magnetometer. The functionality of the magnetometer sensor may also be adjusted based on which zone the magnet has been installed in, so that the magnetometer sensor may still be used even when the magnet is not installed at an ideal distance.

An opening sensor may include two physical components, a magnet and a magnetometer sensor. The magnetometer sensor may include a magnetometer, which may be any suitable device for detecting a magnetic field, such as a compass, along with any other suitable sensors or devices, such as an accelerometer and a reed switch. The magnetometer sensor may also include a microcontroller with a processor for controlling the operating of the magnetometer sensor. The processor may send a request for data obtained by the compass, which can then activate into a working mode in which it can gather and send data to the processor. The working mode may be powered by a power supply such as a battery and/or at least partly from energy received in connection with the query from the processor. For example, the compass may receive power from an antenna that receives a query from a remote processor system, much as RFID devices receive and use power from queries. The compass may detect a magnetic field and send data regarding the sensed field to the processor. The processor may compare or otherwise correlate the magnetic field data received from the compass with the movement data received from the accelerometer. Based on the results of the correlation, the processor can assess changes in orientation, the degree of the movement of the door, and/or detect any inconsistencies between the data reported by the compass and data reported by another sensor type on the magnetometer sensor, such as an accelerometer.

The installation of the opening sensor may involve placing the two physical components of the opening sensor on separate parts of an entry point. For example, the magnet may be placed on the top of a door frame, while the magnetometer sensor may be placed at the top of the door, below the placement of the magnet. The magnetometer sensor and the magnet may be aligned. The magnet may be the source of the second magnetic field detected by the magnetometer, which may be the compass. Movement of the entry point, for example, opening the door, may result in the strength of the second magnetic field as detected by the magnetometer changing, for example, growing weaker as the door is opened further and the magnetometer sensor moves farther from the magnet. A compass magnetometer may also detect a change in the apparent orientation of the second magnetic field.

The distance between the magnet and the magnetometer sensor, along with the strength of the magnet and the sensitivity of the magnetometer in the magnetometer sensor, may influence data on magnetic field and/or the orientation reported by the magnetometer sensor and the functionality of the opening sensor. For example, if the magnetometer sensor is installed too close to the magnet, the magnetometer may be saturated. A saturated magnetometer may not detect when the entry point is opened slightly. A saturated magnetometer may not detect a change in the strength of the second field until the magnetometer is moved beyond some minimum distance away from the magnet so that it is no longer saturated, as the saturated magnetometer may register the same strength for the second magnetic field, the saturation strength, at every point until the minimum distance is passed This minimum distance may be greater than the distance at which it may be desirable for the magnetometer to detect movement of the entry point through a decrease in the strength of the second magnetic field. Additionally, placing the magnet too close to the magnetometer may make it easier for a potential intruder to defeat the opening sensor may placing a strong magnet close to the magnetometer sensor. A saturated magnetometer may be used by an opening sensor to monitor the entry point, but the magnetometer, may need to be calibrated. If the magnetometer sensor is installed too far from the magnet, the magnetometer may not detect the second magnetic field from the magnet at all. This may render the opening sensor non-functional, as the magnetometer may not be able to detect changes in the strength of the second magnetic field when the entry point moves, so the magnetometer may not detect movement of the entry point.

There may be distances between those at which saturation from the second magnetic field occurs, and at which the second magnetic field is not detected. Such distances may have varying levels of optimality for the placement of the magnet. For example, the magnet may be placed at a distance from the magnetometer that may be closer to the distance at which the second magnetic field is not detected than to the distance at which the magnetometer is saturated. This placement of the magnet may be sub-optimal, but the opening sensor may partially function. At such a distance, partial opening of the entry point may be indistinguishable from full opening of the entry point to the magnetometer sensor. Thus, the opening sensor may only be able to determine whether the entry point is open or closed, and may not be able to determine degrees of partial openness. This may result in the opening sensor functioning in a binary mode, as any partial opening of the entry point may be detected by the magnetometer sensor as a full opening of the entry point.

There may be an optimal distance at which the magnet can be placed relative to the magnetometer sensor at which the opening sensor may be fully functional. This distance may be, for example, closer to the distance at which the magnetometer is saturated by the second magnetic field than to the distance at which the magnetometer does not detect the second magnetic field at all. At such a distance, the opening sensor may be able to detect not only whether the entry point is open or closed, but the degree to which the entry point is open. The magnetometer sensor may be able to distinguish between, for example, a door that is one-tenth open, with the door forming a 10 degree angle with the door frame, and a door that is fully open, with the door forming a 90 degree or greater angle with the door frame.

The magnetometer sensor may include a feedback device to guide installation of the magnet and the magnetometer sensor. The feedback device may be, for example, an LED, an array of LEDS, a display screen, a speaker, or any suitable device for providing feedback to a person installing the opening sensor. For example, the magnetometer may include one or more LEDs that may emit red, green, or yellow light. The LED may be located on the body of the magnetometer sensor such that it may be visible to a person attempting to install the magnetometer sensor on an entry point.

During the installation of the opening sensor, the magnetometer sensor may be affixed to a moving portion of an entry point. For example, the magnetometer sensor may be affixed to a door within a door frame, or to a moving portion of a window that slides, tilts, or opens. The magnet may then be affixed to a static portion of the entry point. For example, the magnet may be affixed to a door frame, a window frame, or another non-moving portion of a window. In some cases, the magnetometer sensor may be affixed to the static portion of the entry point, while the magnet is affixed to the moving portion. For example, if the magnetometer sensor does not include an accelerometer, the magnetometer sensor may be affixed to either the static portion or the moving portion of the entry point during installation of the opening sensor.

The feedback device on the magnetometer sensor may provide feedback on the suitability of the distance between the magnetometer sensor and the magnet for optimal functionality of the opening sensor. The magnetometer may be active in the magnetometer sensor during the installation process. The magnetometer may detect the strength of the second magnetic field, for example, continually, or based on requests from the processor or a timer, and report the detected strength to the processor. The processor may use the detected strength to determine the relative distance between the magnet and the magnetometer. The relative distance may be an indication of whether the magnet is too close or too far from the magnetometer sensor, and if the magnet is too far, whether the magnet is too far for the second magnetic field to be detected, or only too far for the magnetic sensor to properly detect partial opening of the entry point. The relative distance may be directly associated with the detected strength of the second magnetic field. This determination of relative distance may be used by the processor to control the feedback device, providing feedback to the person installing the magnet. The person installing the magnet may wait to affix the magnet, or the magnetometer sensor, until the feedback device provides feedback indicating that the magnet is an optimal distance from the magnetometer given any limitations governing the installation, such as areas where the magnet or magnetometer cannot be affixed due to, for example, aesthetics or materials or surfaces involved.

For example, the processor may cause an LED on the magnetometer sensor to blink yellow when the magnet has been placed too close to the magnetometer sensor. The LED blinking yellow may indicate that the magnetometer, for example, the compass, is saturated. The processor may cause the LED to show solid red when the magnet has been placed too far from the magnetometer sensor. The LED showing solid red may indicate that the magnetometer cannot detect the second magnetic field from the magnet. The processor may cause the LED to show solid yellow when the magnet has been placed at a distance from magnetometer sensor where partial opening of the entry point cannot be detected properly, and the opening sensor will only be able to determine if the entry point is open or closed. The LED showing solid yellow may indicate that the magnetometer can detect the second magnetic field and is not saturated, but is far enough from the magnet that movement of the moving portion of the entry point will cause the detected strength of the second magnetic field to drop rapidly, preventing the magnetometer sensor from distinguishing partial opening of the entry point from full opening of the entry point. The processor may cause the LED to show solid green when the magnet has been placed at an optimal distance from the magnetometer sensor. The LED showing solid green may indicate that the magnetometer can detect the second magnetic field, is not saturated, and is close enough to detect smaller changes in the strength of the magnetic field when the moving portion of the entry point moves. The person installing the opening sensor may wait until they have found a position for the magnet relative to the magnetometer sensor that causes the LED of the magnetometer sensor to show solid green before affixing the magnet or magnetometer sensor.

During the installation process, the indications output by the feedback device may change as the person installing the opening sensor moves either the magnet or the magnetometer sensor. For example, the magnetometer sensor may be affixed to the top of a door. The person installing the opening sensor may then place the magnet against the door frame at any position aligned vertically with the magnetometer sensor. The magnetometer may detect the strength of the second magnetic field, and the processor may use the detected strength to determine the relative distance between the magnet and the magnetometer. The processor may cause the LED to indicate this relative distance. For example, the LED may show solid red, indicating that the person installing the opening sensor has placed the magnet too far from the magnetometer sensor. The person installing the opening sensor may see the LED showing solid red, and may begin to move the magnet closer to the magnetometer sensor. If the person installing the opening sensor moves the magnet too close to the magnetometer sensor, the LED may switch from showing solid red to blinking yellow. The person installing the opening sensor may then move the magnet further away from the magnetometer sensor, until the LED begins to show solid green, at which point they may affix the magnet at its current position. If, for example, the person installing the opening sensor moves the magnet too far from the magnetometer again, the LED may show solid yellow, which may indicate to the person that they have moved the magnet too far and need to start moving it back towards the magnetometer sensor. In this way, the feedback device, such as the LED, of the magnetometer sensor may be used to guide the positioning of the magnet and the magnetometer sensor relative to each other.

In some instances, the magnet and the magnetometer sensor may not be installed at an optimal relative distance. For example, structural elements of the entry point such as moldings may prevent the magnet from being affixed to the stationary portion of the entry point at the optimal distance from the magnetometer. In some instances, the person installing the opening sensor may install the magnet and the magnetometer sensor at a less than optimal distance from each other even when it may be possible, for example, due to failure to properly follow installation instructions. If the magnet and magnetometer are installed at a distance other than optimal distance, some functionality of the opening sensor may be disabled. For example, the magnetometer sensor may include a reed switch. If the magnetometer is too far from the magnet, the functionality of the reed switch may be disabled, so that the opening sensor may not report the status of the reed switch to a controller of a security system. The opening sensor's ability to report a partial opening of the entry point may also be disabled if the magnetometer is too far from the magnet, but still close enough to detect the second magnetic field. Instead, the opening sensor may only report a binary open or closed status for the state of the entry point, with any detected opening of the entry point, partial or full, being reported as open. If the magnetometer is too far from the magnet to detect the second magnetic field, all functionality of the opening sensor may be disabled. If the magnet and the magnetometer sensor are installed too close together, the opening sensor may be able to report partial opening of the entry point, but may require calibration first, and may not be able to detect some partial opening due the magnetic field strength not dropping until the entry point has been opened far enough that the magnetic field from the magnet no longer saturates the magnetometer.

While the opening sensor is in use, the feedback device may function as a security level indicator. For example, the LED on the magnetometer sensor may display whatever indicator corresponds to the current relative distance between the magnet and magnetometer sensor. For example, if the LED was showing solid green when the magnet and magnetometer were affixed to the entry point, the LED may continue to show solid green during the course of normal operation monitoring the entry point, indicating a high security level, as all the functions of the opening sensor are enabled and the opening sensor cannot be fooled by placement of strong magnet nearby. For example, even if the entry point is opened to the point that the magnetometer no longer detects the second magnetic field, the LED may continue to show solid green. The processor of the magnetometer sensor may use data from, for example, an accelerometer or a compass magnetometer to determine that the indicator displayed by the LED should not be changed, as the change in magnetic field may be due to the entry point being opened, and not due to the magnet having been placed too far from the magnetometer sensor.

FIG. 1 shows an example system suitable for guided installation of an opening sensor according to an implementation of the disclosed subject matter. An opening sensor 100 may include two separate physical components, a magnetometer sensor 110 and a magnet 120. The magnetometer sensor 110 may include a microcontroller 145 for a magnetometer 155, a power source 115, and a transceiver (e.g., using radio or another communications medium) represented by the communication chipset 135. The communication chipset may refer to hardware suitable for wired and/or wireless communications such as an Ethernet connection. The microcontroller 145 may include a processor 147, a computer readable memory 149 that may be programmed with computer readable code. The microcontroller 145 may receive instructions (which may include configuration information and activation signals) from a controller, for example, controller 73 as described in FIG. 11, and/or a remote system such, for example, remote system 74 as described in FIG. 11. Similarly, the microcontroller 145 may communicate data generated by the magnetometer 155, and other sensors that may be part of the magnetometer sensor 110, such as, for example, an accelerometer or a reed switch, to the controller 73 and/or the remote system 74 via the communication chipset 135. The magnetometer sensor 110 may refer to the magnetometer 155, microcontroller 145, power source 115, the LED 125, and the communication chipset 135 some or all of which may be disposed in a single physical unit. The magnetometer sensor 110 may receive power from any suitable power source 115, such as, for example, a lithium battery, an electrical outlet, or a wireless power supply. The magnet 120 may be a permanent magnet of any suitable material inside of a housing of any suitable material that may not interfere with the magnetic field produced by the magnet. When installed, the magnet 120 may be oriented so that a line between the north and south poles of the permanent magnet would be oriented parallel to border in between the magnet 120 and the magnetometer sensor 110.

Figure 2:
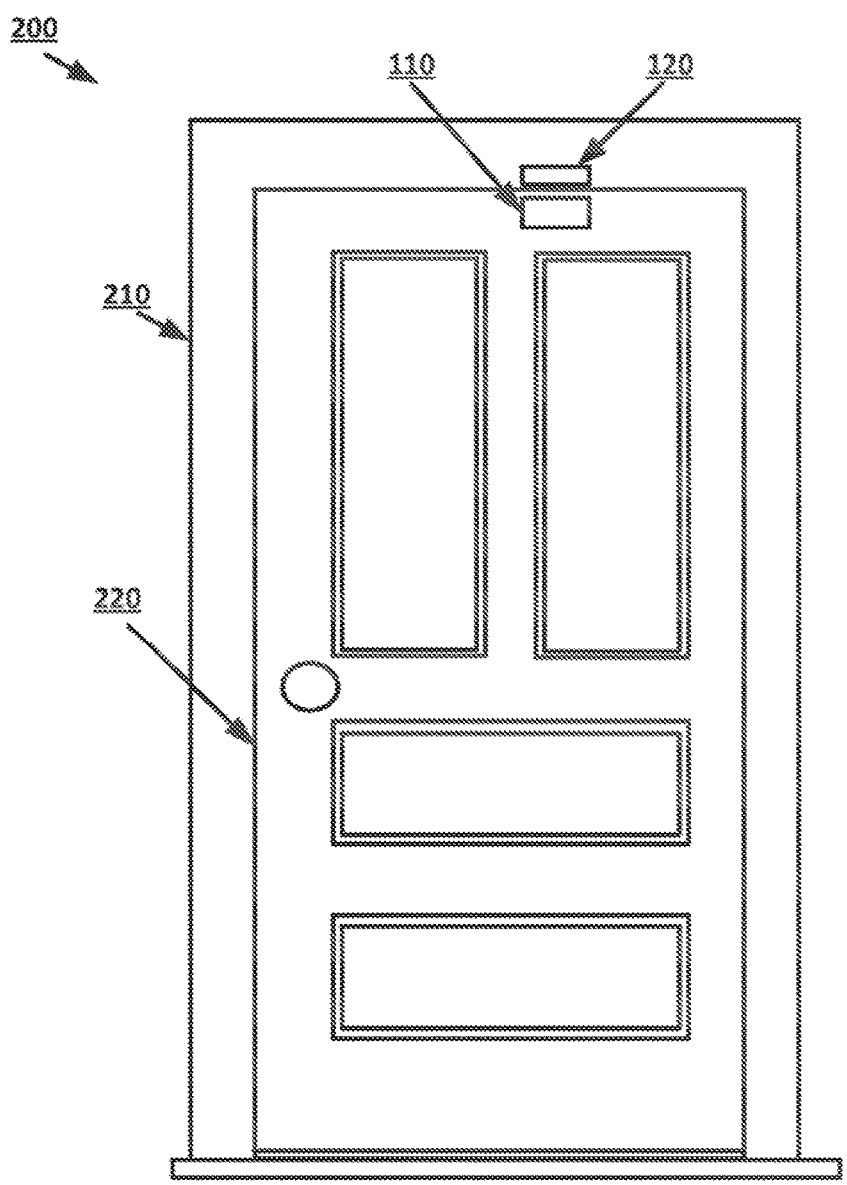
FIG. 2 shows an example installation using guided installation of an opening sensor according to an implementation of the disclosed subject matter.

FIG. 2 shows an example installation using guided installation of an opening sensor according to an implementation of the disclosed subject matter. The opening sensor 100 may be installed at an entry point 200, which may include a door 220 installed in a door frame 210. The entry point 200 may be an interior entry point, for example, between rooms in a house, or an exterior entry point, for example, between the inside of a house and an outdoor area. The magnetometer sensor 110, including the magnetometer 155 and other sensors, such as an accelerometer, may be affixed to the inside of the door 220 in any suitable manner, such as, for example, using touch fasteners, tape, adhesive, or fastening mechanisms such as screws or bolts. The magnetometer sensor 110 may affixed at any suitable point on door 220, including, for example, at the top of the door 220. The magnet 120 may be affixed to the door frame 210 in any suitable position near where the magnetometer sensor 110 is affixed to the door 220. For example, if the magnetometer sensor 110 is affixed to the top of the door 220, the magnet 120 may be affixed to the top of the door frame 210 at a position vertically aligned with the magnetometer sensor 110. If the magnetometer sensor 110 is affixed to the side of the door 220, for example, the side from which the door 220 opens, the magnet 120 may be affixed to the door frame 210 and horizontally aligned with magnetometer sensor 110. The magnetometer 155, which may be, for example, a compass, may sense the magnetic field generated by the magnet 120. When door 220 opens, the magnetometer 155 may become more distal to the magnet 120 and may sense a weaker magnetic field from the magnet 120. As the door 220 closes, the magnetometer 155 may become closer to the magnet 120 and sense a magnetic stronger field. Various implementations disclosed herein can use sensor data relating to a specific motion (or lack thereof), orientation, change in motion or orientation and rates of change in motion and/or orientation. For example, the magnetometer sensor 110 may include an accelerometer which may generate data regarding motion of the magnetometer sensor 110. Data from an accelerometer may be used, for example, to determine if a change in the strength of the magnetic field detected by the magnetometer 155 is due to motion of the magnetometer sensor 110 or motion of the magnet 120 or interference from a material or another magnet's magnetic field.

Figure 3:
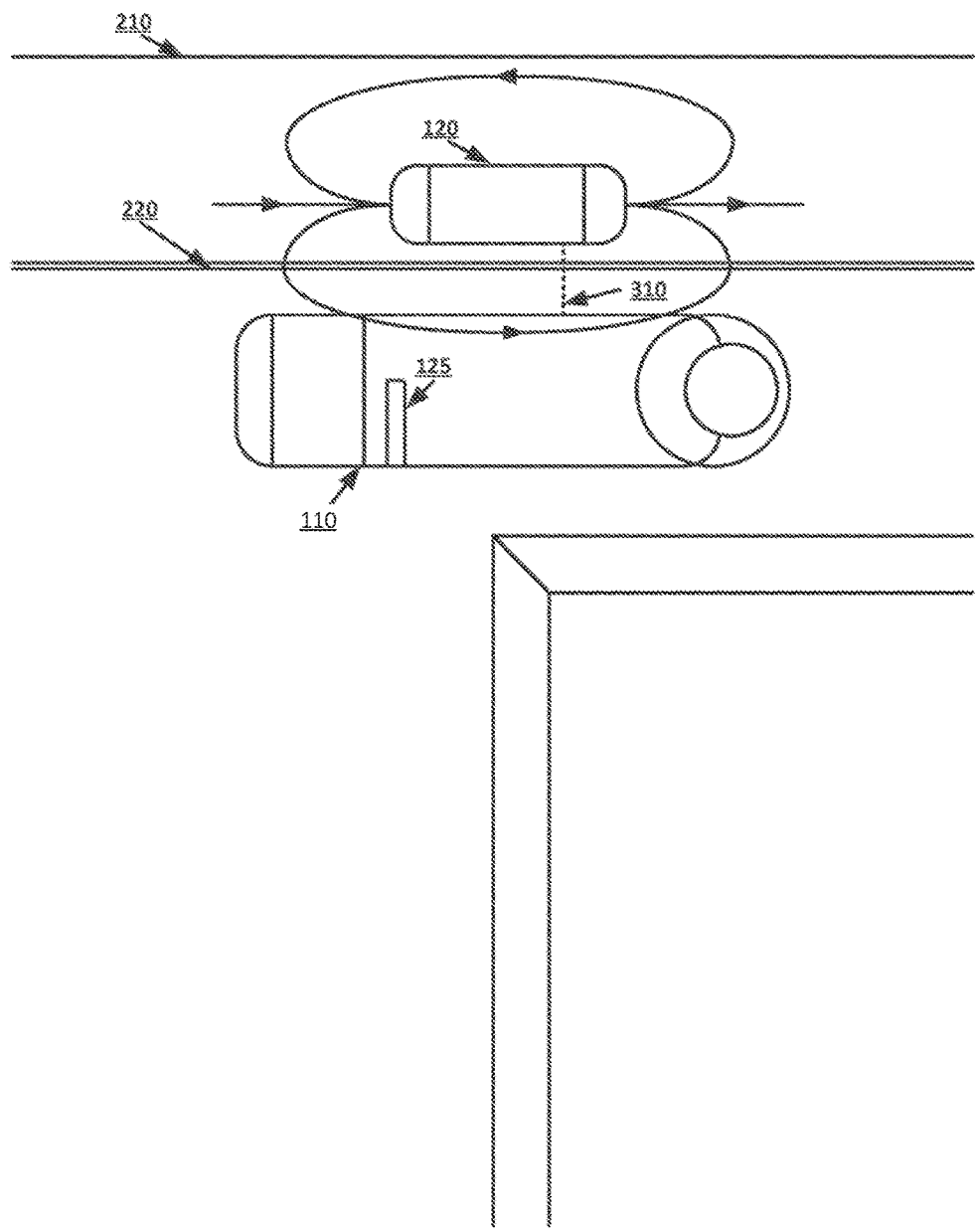
FIG. 3 shows an example installation using guided installation of an opening sensor according to an implementation of the disclosed subject matter.

FIG. 3 shows an example installation using guided installation of an opening sensor according to an implementation of the disclosed subject matter. The magnetometer sensor 110, including LED 125, may be placed at the top of the door 220, so that the LED 125 may face outwards and be visible to a person installing the magnetometer sensor 110. The magnet 120 may be installed on the door frame 210, vertically aligned with the magnetometer sensor 110. A line between the north and south poles of the magnet 120 may be parallel with the border between the magnet 120 and the magnetometer sensor 110, for example, parallel with the top of the door 220. The magnetic field of the magnet 120 may be detected by the magnetometer 155 of the magnetometer sensor 110 if the magnet 120 and the magnetometer sensor 110 are placed close enough together. Both the magnet 120 and the magnetometer sensor 110 may be affixed to the door frame 210 and the door 220 in any suitable manner.

Figure 4:
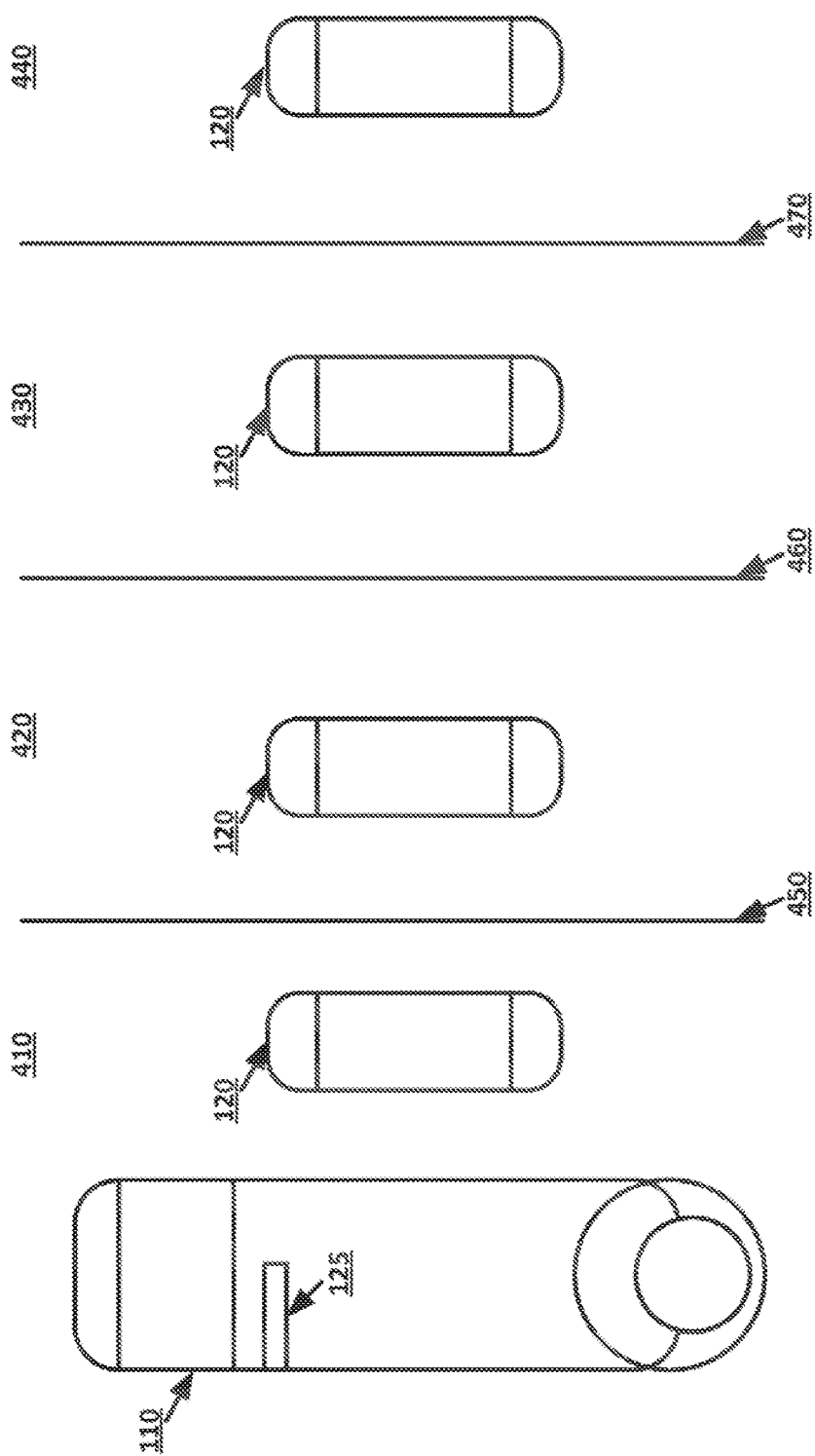
FIG. 4 is an example of the interaction between the accelerometer and the compass as disclosed herein.

FIG. 4 shows an example of installation positions using guided installation of an opening sensor according to an implementation of the disclosed subject matter. The relative distance from the magnetometer sensor 110 to the magnet 120 may determine the functionality of the opening sensor 100. A first zone 410 may be in between the magnetometer sensor 110 and a first threshold 450. If the placement of the magnet 120 relative to the magnetometer sensor 110 falls within the first zone 410, with the distance between the magnetometer sensor 110 and the magnet 120 being less than the distance between the magnetometer sensor 110 and the first threshold 450, then the magnetometer 155 may be saturated by the magnetic field of the magnet 120. The opening sensor 100 may be able to detect partial opening of the entry point, but may require calibration. Without calibration, a reed switch may be used instead of the magnetometer 155 to monitor the opening and closing of the entry point. The first threshold 450 may be, for example, 25 mm from the magnetometer sensor 110.

A second zone 420 may be in between the first threshold 450 and a second threshold 460. If the placement of the magnet 120 relative the magnetometer sensor 110 falls within the second zone 420, with the distance between the magnetometer sensor 110 and the magnet 120 being greater than the first threshold 450 and less than the second threshold 460, then the magnetometer 155 may be not be saturated by the magnetic field of the magnet 120. The magnetometer 155 may be able detect changes in the strength of the magnetic field from the magnet 120 with enough precision that the magnetometer sensor 110 may be able to determine varying degrees of partial openness of an entry point and distinguish partial openness from full openness. The opening sensor 100 may be able to report the varying degrees of partial openness of the entry point after proper calibration.

A third zone 430 may be in between the second threshold 460 and a third threshold 470. If the placement of the magnet 120 relative the magnetometer sensor 110 falls within the third zone 430, with the distance between the magnetometer sensor 110 and the magnet 120 being greater than the second threshold 460 and less than the third threshold 470, then the magnetometer 155 may be not be saturated by the magnetic field of the magnet 120, which may be detected as weak by the magnetometer 155. The magnetometer 155 may be able detect changes in the strength of the magnetic field from the magnet 120, but not with enough precision that the magnetometer sensor 110 may be able to determine varying degrees of partial openness of an entry point and distinguish partial openness from full openness. For example, the magnetic field from the magnet 120 may be weak enough that any opening of the entry point, increasing the distance between the magnetometer 155 and the magnet 120, may cause the magnetometer 155 to be unable to detect the magnetic field from the magnet 120 at all. The opening sensor 100 may be able to report whether the entry point is open or closed after proper calibration, but may not be able to report varying degrees of partial openness. Any opening of the entry point detected by the magnetometer sensor 110, from slightly open to fully open, may be reported the same way by the opening sensor 100.

A fourth zone 440 may be beyond the third threshold 470. If the placement of the magnet 120 relative the magnetometer sensor 110 falls within the third zone 430, with the distance between the magnetometer sensor 110 and the magnet 120 being greater than the third threshold 470, then the magnetometer 155 may not be able to detect the magnetic field from the magnet 120. The magnetometer 155 may be unable to detect the magnetic field from the magnet 120 at all, as the strength of the magnetic field from the magnet 120 at the location of the magnetometer sensor 110 may near or at zero. The opening sensor 100 may be unable to report on the status of the entry point, as the inability of the magnetometer 155 to detect the magnetic field from the magnet 120 may prevent the magnetometer sensor 110 from determining whether the entry point is opened or closed.

The distances of the first threshold 450, the second threshold 460, and the third threshold 470 from the magnetometer sensor 110 may be based on the strength of the magnet 120 and the sensitivity of the magnetometer 155. For example, a stronger magnet 120 may create a stronger magnetic field, which may cause the first threshold 450 to be farther from the magnetometer sensor 110 than it would be were the magnet 120 weaker.

Figure 5:
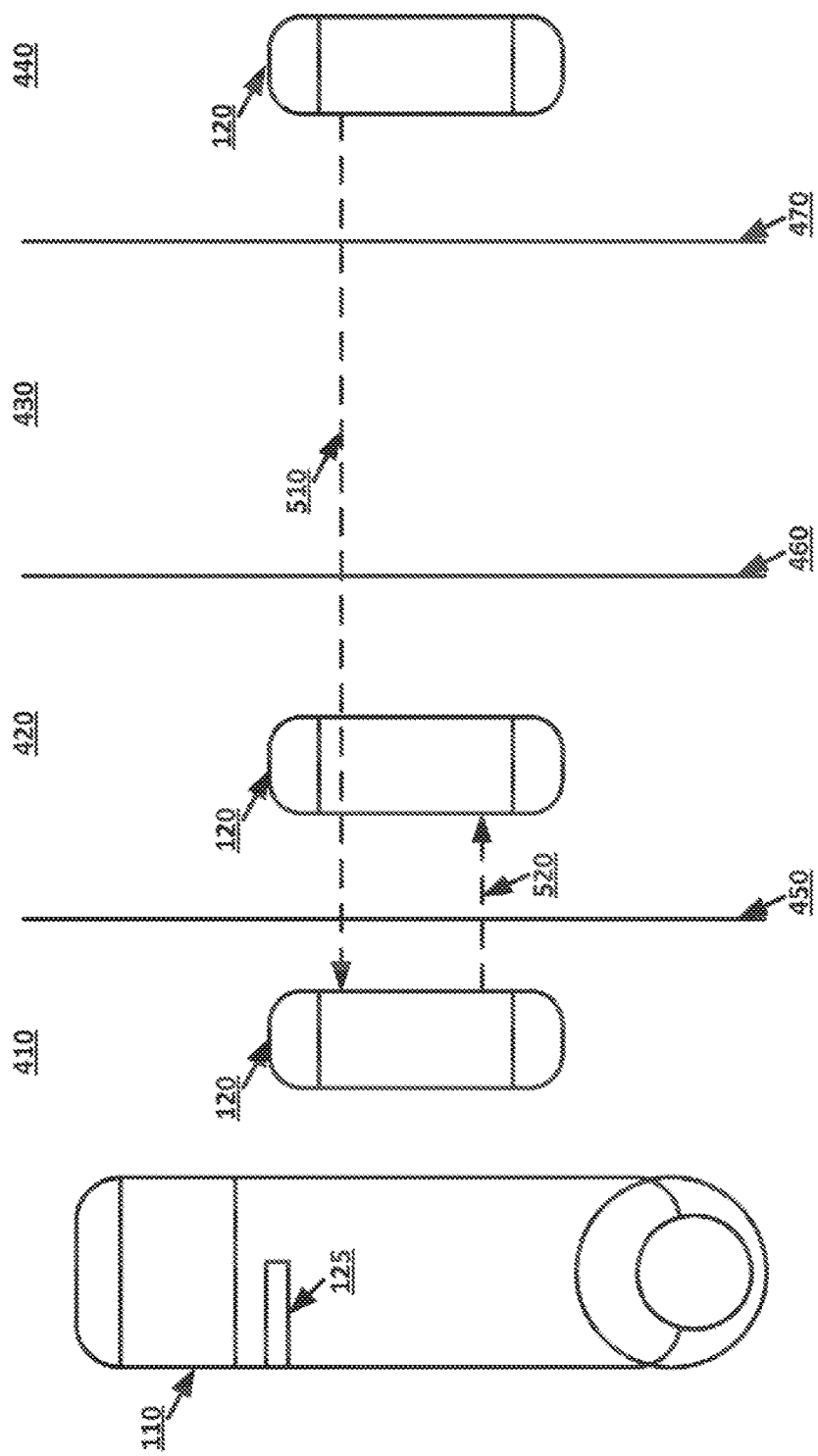
FIG. 5 shows an example of installation positions using guided installation of an opening sensor according to an implementation of the disclosed subject matter.

FIG. 5 shows an example of installation positions using guided installation of an opening sensor according to an implementation of the disclosed subject matter. During installation of the opening sensor 100, a feedback device such as the LED 125 may be used to guide the installation by providing feedback to the person performing the installation. For example, a person performing an installation may initially place the magnet 120 and the magnetometer sensor 110 relative to each other such that the magnet 120 is in the fourth zone 440, far enough from the magnetometer sensor 110 to be beyond the third threshold 470. The magnetometer 155 may not detect the magnetic field from the magnet 120. The magnetometer 155 may send data to the processor 147 indicating the total detected magnetic field strength at the location of the magnetometer 155. The total detected magnetic field strength may be greater than zero, as the magnetometer 155 may detect other magnetic fields, such as, for example the geomagnetic field. The processor 147 may use the total detected magnetic field strength to determine that the magnetic field from the magnet 120 is not detected. The processor 147 may, for example, subtract a known strength of the geomagnetic field from the total detected magnetic field strength reported by the magnetometer 155 to determine the detected strength of the magnetic field from the magnet 120. The processor 147 may determine based on the detected strength of the magnetic field from the magnet 120 that the relative distance between the magnet 120 and the magnetometer sensor 110 is too great, and that the magnet 120 is in the fourth zone 440 relative to the magnetometer sensor 110. The processor 147 may cause the LED 125 to show solid red.

The person performing the installation of the opening sensor 100 may see that the LED 125 is showing solid red, and may understand that this indication means the magnet 120 is too far from the magnetometer sensor 110. The person may then decrease the relative distance from the magnet 120 to the magnetometer sensor 110. For example, if the magnetometer sensor 110 has already been affixed, for example, to the door 220, the person may move the magnet 120 to a different position, for example, on the door frame 210. The person may move the magnet 120 along path 510 into the first zone 410. The magnetometer 155 may send data to the processor 147 indicating the total detected magnetic field strength at the location of the magnetometer 155. The processor 147 may then determine the detected strength of the magnetic field from the magnet 120. The processor 147 may determine that the detected strength of the magnetic field from the magnet 120 is high enough to saturate the magnetometer 155. For example, the detected strength of the magnetic field from the magnet 120 may be the maximum strength that the magnetometer 155 is capable of detecting, as the magnetization of the magnetic material in the magnet 120 may not be increased by further increases in the strength of the magnetic field. The processor 147 may cause the LED 125 to blink yellow.

The person performing the installation of the opening sensor 100 may see that the LED 125 is blinking yellow, and may understand that this indication means the magnet 120 is too close to the magnetometer sensor 110. The person may then increase the relative distance from the magnet 120 to the magnetometer sensor 110. For example, the person may move the magnet 120 to a different position, for example, on the door frame 210, by moving the magnet 120 along path 520 into the second zone 420. The magnetometer 155 may send date to the processor 147. The magnetometer 155 may send data to the processor 147 indicating the total detected magnetic field strength at the location of the magnetometer 155. The processor 147 may then determine the detected strength of the magnetic field from the magnet 120. The processor 147 may determine that the detected strength of the magnetic field from the magnet 120 is high enough for magnetometer sensor 110 to be able to distinguish between varying degrees of openness of the entry point, but not so high that the magnetometer 155 is saturated. The processor 147 may cause the LED 125 to show solid green. The person performing the installation of the opening sensor 100 may see the LED 125 showing solid green and understand that this indication means the magnet 120 is an optimal position. The person may then affix the opening sensor 100. For example, the person may affix whichever of the magnet 120 and the magnetometer sensor 110 is not yet affixed to the entry point, keeping the relative distance between them so that the magnet 120 is in second zone 420 relative to the magnetometer sensor 110. This may complete physical installation of the opening sensor 100.

Figure 6:
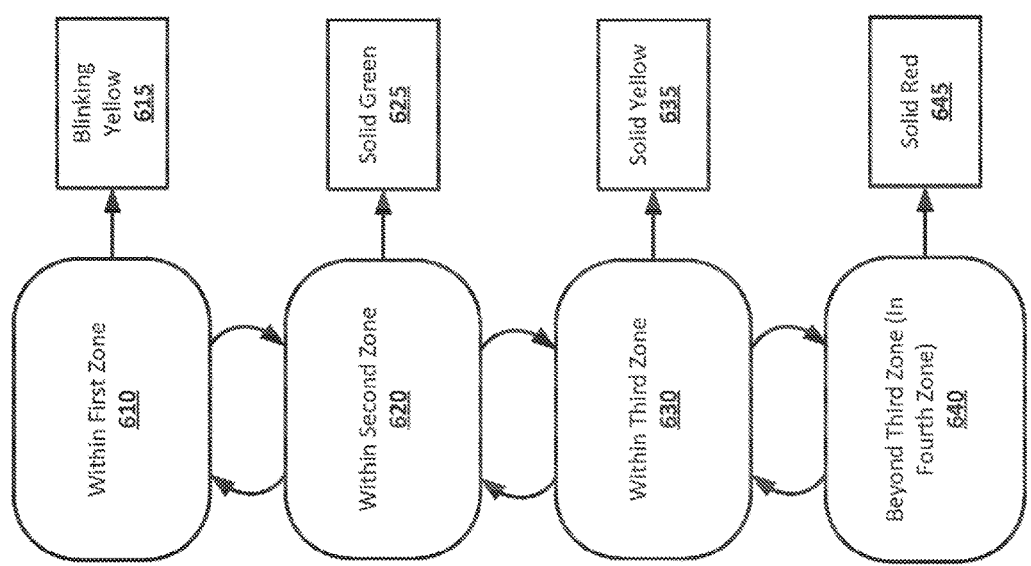
FIG. 6 shows an example of state diagram for guided installation of an opening sensor according to an implementation of the disclosed subject matter.

FIG. 6 shows an example of state diagram for guided installation of an opening sensor according to an implementation of the disclosed subject matter. In state 610, the relative distance between the magnet 120 and the magnetometer sensor 110 may place the magnet 120 within the first zone 410. The LED 125 of the magnetometer sensor 110 may show indication 615, blinking yellow.

In state 620, the relative distance between the magnet 120 and the magnetometer sensor 110 may place the magnet 120 within the second zone 420. The LED 125 of the magnetometer sensor 110 may show indication 625, solid green.

In state 630, the relative distance between the magnet 120 and the magnetometer sensor 110 may place the magnet 120 within the third zone 430. The LED 125 of the magnetometer sensor 110 may show indication 635, solid yellow.

In state 640, the relative distance between the magnet 120 and the magnetometer sensor 110 may place the magnet 120 within the fourth zone 440. The LED 125 of the magnetometer sensor 110 may show indication 645 solid red.

As the relative distance between the magnet 120 and the magnetometer sensor 110 changes during the installation of the opening sensor 100, the state of the opening sensor 100 may transition between the states 610, 620, 630, and 640. Each state transition may be accompanied by a change from the indication for the previous state to the indication for the new state. For example, as the relative distance between the magnet 120 and the magnetometer sensor 110 is decreased, the opening sensor 100 may go from the state 640 to the state 630, and the indication may change from the indication 645, for example, the LED 125 showing solid red, to the indication 635, for example, the LED 125 showing solid yellow. The transitions between the states 610, 620, 630, and 640 may occur in any order, and may begin and end at any of the states 610, 620, 630, and 640.

Figure 7:
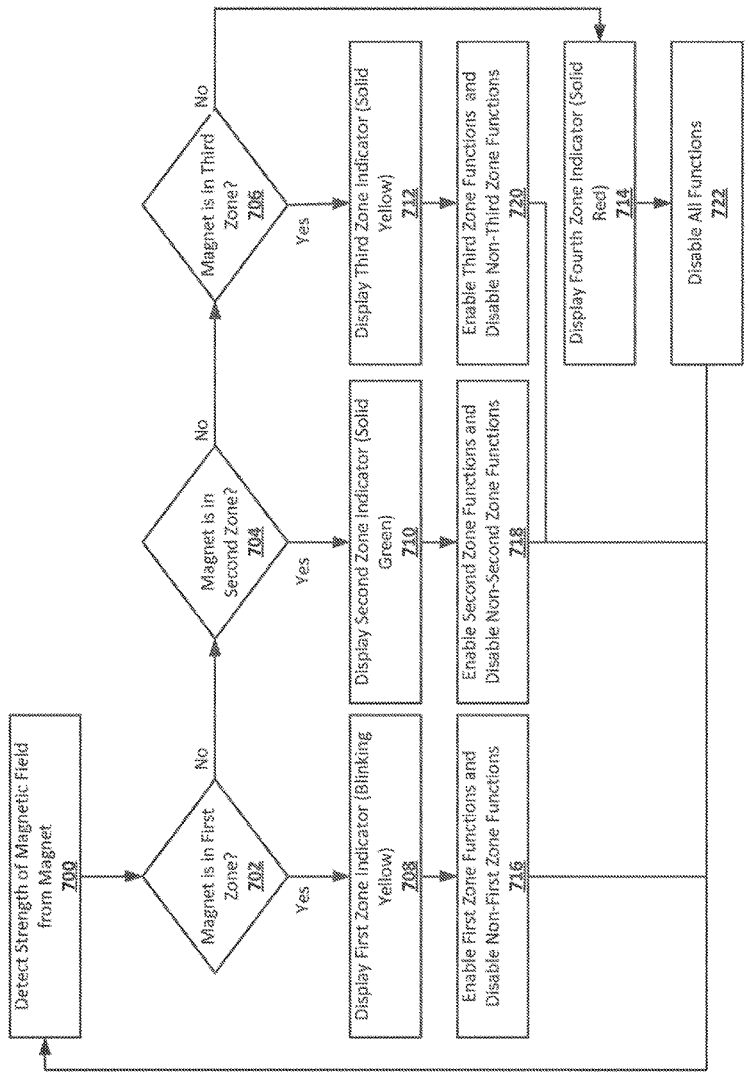
FIG. 7 shows an example of a process suitable for guided installation of an opening sensor according to an implementation of the disclosed subject matter.

FIG. 7 shows an example of a process suitable for guided installation of an opening sensor according to an implementation of the disclosed subject matter. At 700, the strength of the magnetic field from a magnet may be detected. For example, the magnetometer sensor 110, using the processor 147 and the magnetometer 155, may detect the strength of the magnetic field from the magnet 120 as experienced at the magnetometer 155. The processor 147 may, for example, receive data from the magnetometer 155 indicating the total detected magnetic field strength at the magnetometer 155, and may adjust this total detected magnetic field strength to account for other magnetic fields, such as the geomagnetic field, to determine the strength of the magnetic field from the magnet 120.

At 702, whether the magnet is in the first zone may be determined. For example, the processor 147 may determine if the relative distance from the magnetometer sensor 110 to the magnet 120 places the magnet 120 in the first zone 410, between the first threshold 450. If the magnet 110 is in the first zone 410, the magnetometer 155 may be saturated, and flow may proceed to 708. Otherwise, flow may proceed to 704.

At 704, whether the magnet is in the second zone may be determined. For example, the processor 147 may determine if the relative distance from the magnetometer sensor 110 to the magnet 120 places the magnet 120 in the second zone 420, between the first threshold 450 and the second threshold 460. If the magnet 110 is in the second zone 420 flow may proceed to 710. Otherwise, flow may proceed to 706.

At 706, whether the magnet is in the third zone may be determined. For example, the processor 147 may determine if the relative distance from the magnetometer sensor 110 to the magnet 120 places the magnet 120 in the third zone 430, between the second threshold 460 and the third threshold 470. If the magnet 110 is in the third zone 430 flow may proceed to 712. Otherwise, flow may proceed to 714, as the magnet 120 may be in the fourth zone 440.

At 708, a first zone indicator may be displayed. For example, the magnet 120 may be in the first zone 410 relative to the magnetometer sensor 110. The magnetometer sensor 110 may display a first zone indicator, for example, the indicator 615, using a feedback device such as the LED 125. For example, the processor 147 of the magnetometer sensor 110 may cause the LED 125 to blink yellow. This may indicate that the magnet 120 is too close to the magnetometer sensor 110, and the magnetometer 155 may be saturated.

At 710, a second zone indicator may be displayed. For example, the magnet 120 may be in the second zone 420 relative to the magnetometer sensor 110. The magnetometer sensor 110 may display a second zone indicator, for example, the indicator 625, using a feedback device such as the LED 125. For example, the processor 147 of the magnetometer sensor 110 may cause the LED 125 to show solid green. This may indicate that the magnet 120 is an optimal distance from the magnetometer sensor 110.

At 712, a third zone indicator may be displayed. For example, the magnet 120 may be in the third zone 430 relative to the magnetometer sensor 110. The magnetometer sensor 110 may display a third zone indicator, for example, the indicator 635, using a feedback device such as the LED 125. For example, the processor 147 of the magnetometer sensor 110 may cause the LED 125 to show solid yellow. This may indicate that the magnet 120 is too far from the magnetometer sensor 110 to properly determine varying degrees of partial openness of an entry point.

At 714, a fourth zone indicator may be displayed. For example, the magnet 120 may be in the fourth zone 440 relative to the magnetometer sensor 110. The magnetometer sensor 110 may display a fourth zone indicator, for example, the indicator 645, using a feedback device such as the LED 125. For example, the processor 147 of the magnetometer sensor 110 may cause the LED 125 to show solid red. This may indicate that the magnet 120 is too far from the magnetometer sensor 110 for the magnetometer 155 to detect the magnetic field from the magnet 120.

At 716, first zone functions may be enabled and non-first zone functions may be disabled. For example, the magnet 120 may be in the first zone 410 relative to the magnetometer sensor 110. Functionality of the opening sensor 100 may be enabled and disabled based on the relative distance between the magnet 120 and the magnetometer sensor 110. For example, the ability of the opening sensor 100 to report partial opening of the entry point based on the magnetometer 155 may be disabled until the magnetometer 155 has been calibrated. If the magnetometer sensor 110 includes a reed switch, the reed switch may be used to monitor the state of the entry point until the magnetometer 155 has been calibrated. Flow may proceed back to 700 until the installation of the opening sensor 100 is complete. Completion of the installation may be signaled by, for example, data received by the communication chipset 135 from the controller 73 (shown in FIG. 11).

At 718, second zone functions may be enabled and non-second zone functions may be disabled. For example, the magnet 120 may be in the second zone 420 relative to the magnetometer sensor 110. Functionality of the opening sensor 100 may be enabled and disabled based on the relative distance between the magnet 120 and the magnetometer sensor 110. For example, the ability of the opening sensor 100 to report partial opening of the entry point based on the magnetometer 155 may be enabled. If the magnetometer sensor 110 includes a reed switch, the reed switch may be enabled. Flow may proceed back to 700 until the installation of the opening sensor 100 is complete. Completion of the installation may be signaled by, for example, data received by the communication chipset 135 from the controller 73 (shown in FIG. 11).

At 720, third zone functions may be enabled and non-third zone functions may be disabled. For example, the magnet 120 may be in the third zone 430 relative to the magnetometer sensor 110. Functionality of the opening sensor 100 may be enabled and disabled based on the relative distance between the magnet 120 and the magnetometer sensor 110. For example, the ability of the opening sensor 100 to report partial opening of the entry point based on the magnetometer 155 may be disabled. The opening sensor 100 may operate in a binary mode, reporting only if the entry point is open or closed, regardless of the degree to which the entry point is open. If the magnetometer sensor 110 includes a reed switch, the reed switch may be disabled. Flow may proceed back to 700 until the installation of the opening sensor 100 is complete. Completion of the installation may be signaled by, for example, data received by the communication chipset 135 from the controller 73 (shown in FIG. 11).

At 722, fourth zone functions may be enabled and non-first zone functions may be disabled. For example, the magnet 120 may be in the first zone 410 relative to the magnetometer sensor 110. Functionality of the opening sensor 100 may be enabled and disabled based on the relative distance between the magnet 120 and the magnetometer sensor 110. For example, the ability of the opening sensor 100 to the status of the entry point based on the magnetometer 155 may be disabled. If the magnetometer sensor 110 includes a reed switch, the reed switch may be disabled. Flow may proceed back to 700 until the installation of the opening sensor 100 is complete. Completion of the installation may be signaled by, for example, data received by the communication chipset 135 from the controller 73 (shown in FIG. 11).

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the embodiments disclosed herein.

Figure 10:
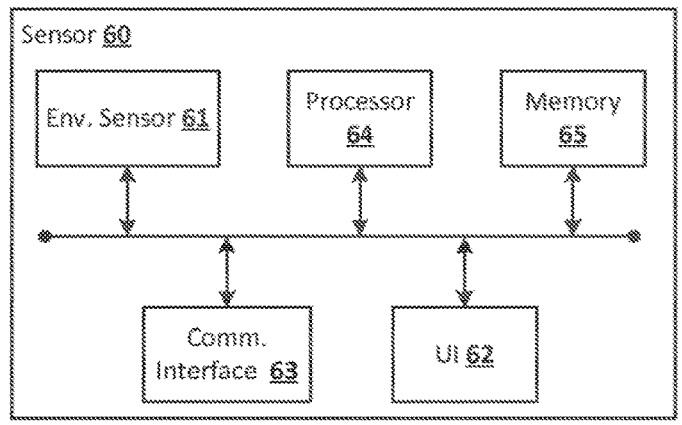
FIG. 10 shows an example sensor as disclosed herein.

A sensor may include hardware in addition to the specific physical sensor that obtains information about the environment. FIG. 10 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

As a specific example, a sensor may include a compass and/or an accelerometer as illustrated by FIGS. 1-7 and described in further detail with respect to FIGS. 1-7.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

As another example, a security system may employ a magnetometer affixed to a doorjamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the security system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer. In a first position, the door is closed and the compass may indicate a first direction. The door may be opened at a variety of positions. The fourth One position may represent the maximum amount the door can be opened. Based on the compass readings, the position of the door may be determined and/or distinguished more specifically than merely open or closed. In a second position, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

The compass may be in one of two different positions. In the first position, the compass detects a first direction. The compass's direction may be a known distance from a particular location. For example, when affixed to a door, the compass may automatically determine the distance from the doorjamb or a user may input a distance from the doorjamb. The distance representing how far away from the doorjamb the door is may be computed by a variety of trigonometric formulas. In the first position, the door may not be separate from the doorjamb (i.e., closed). In the second position, the distance between the doorjamb and the door may indicate that the door has been opened wide enough that a person may enter. Thus, the sensors may be integrated into a home security system, mesh network (e.g., Thread), or work in combination with other sensors positioned in and/or around an environment.

Figure 11:
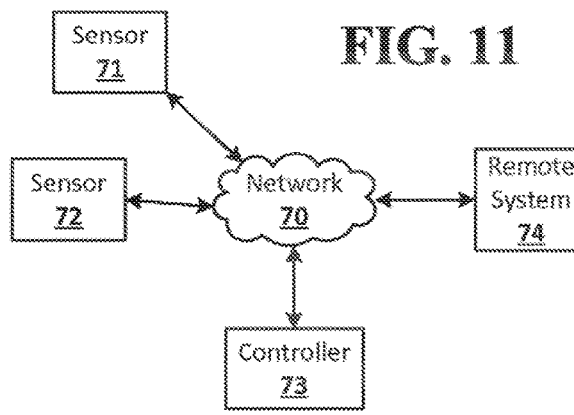
FIG. 11 shows an example of a sensor network as disclosed herein.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74 as shown in FIG. 11. The data may be analyzed to learn a user behavior, an environment state, and/or as a component of a home security or home automation system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, etc.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point an abrupt increase in the amount of light is detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, a mesh network (e.g., Thread), and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 11 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 73 such as where multiple occupants' smartphones and/or smartwatches are authorized to control and/or send/receive data to or from the various sensors 71, 72 deployed in the home. Alternatively or in addition, sensors may communicate directly with a remote system. The remote system 74 may, for example, aggregate data from multiple locations, provide instruction, software updates, and/or aggregated data to a controller 73 and/or sensors 71, 72.

The sensor network shown in FIG. 11 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 11 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The controller may determine an intensity level of illumination for lights connected to the smart home system and/or a color or temperature for the lights. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 11.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 11, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 11, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 11 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 11. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 71, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 11. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entryways, and the like are closed and/or that all smart entry detectors are in an away mode. In some configurations, the system may arm if it can be determined that the distance the door (or window) is ajar is insubstantial (e.g., the opening is not wide enough for a person to fit through).

The smart-home environment of the sensor network shown in FIG. 11 can include one or more intelligent, multi-sensing, network-connected doorknobs (e.g., "smart doorknob"). For example, the sensors 71, 72 may be coupled to a doorknob of a door (e.g., doorknobs located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 11) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 12:
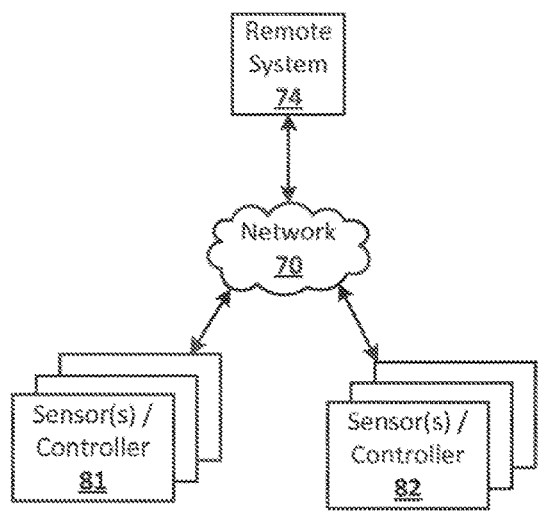
FIG. 12 shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 11 may provide information to the remote system 74 as shown in FIG. 12. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. As another example, systems disclosed herein may allow a user to restrict the information collected by the systems disclosed herein to applications specific to the user, such as by disabling or limiting the extent to which such information is aggregated or used in analysis with other information from other users. Thus, the user may have control over how information is collected about the user and used by a system as disclosed herein.

Figure 8:
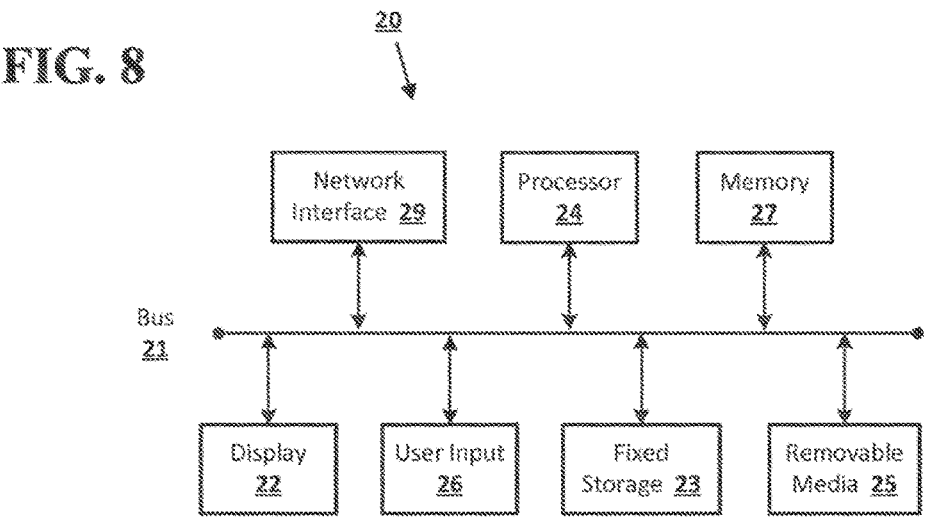
FIG. 8 shows a computer according to an implementation of the disclosed subject matter.

Implementations of the presently disclosed subject matter may be implemented in and used with a variety of component and network architectures. FIG. 8 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output (I/O) controller (not shown), a user display 22, such as a display screen via a display adapter, a user input interface 26, which may include one or more controllers and associated user input devices such as a keyboard, mouse, and the like, and may be closely coupled to the I/O controller, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 9.

Many other devices or components (not shown) may be connected in a similar manner (e.g., document scanners, digital cameras, and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
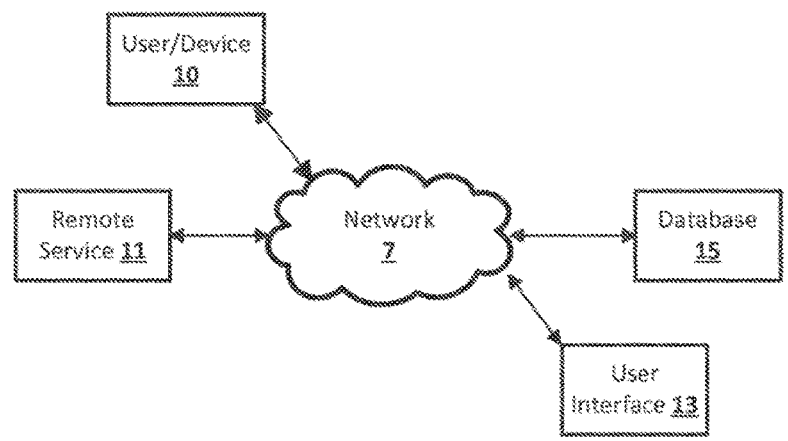
FIG. 9 shows a network configuration according to an implementation of the disclosed subject matter.

FIG. 9 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers and/or databases 15. The devices may be directly accessible by the clients 10, 11, or one or more other devices may provide intermediary access such as where a server provides access to resources stored in a database 15. The clients 10, 11 also may access remote platforms or services provided by remote platforms such as cloud computing arrangements and services. The remote platform may include one or more servers and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   determining, at a magnetometer sensor of an opening sensor, a strength of a magnetic field created by a magnet of the opening sensor; and
   providing, using a display screen, feedback indicating one of more than two discrete ranges of distance between the magnet and the magnetometer sensor, wherein the feedback is based on the determined strength of the magnetic field, wherein a first one of the indicated ranges of distance corresponds to saturation of the magnetometer sensor by the magnetic field, such that if a distance between the magnet and the magnetometer sensor is within the first range, the magnetometer sensor is saturated.

2. The method of claim 1, wherein the display screen is a part of the magnetometer sensor.

3. The method of claim 1, wherein the display screen is a part of at least one of:
   a separate computing device,
   a tablet computer,
   a smartphone,
   a smartwatch,
   a laptop computer,
   a desktop computer, or
   a combination thereof.

4. The method of claim 1, wherein the magnet is in one of a plurality of zones relative to the magnetometer sensor, and the plurality of zones comprises:
   a first zone between the magnetometer sensor and a first threshold distance,
   a second zone between the first threshold distance and a second threshold distance farther from the magnetometer sensor than the first threshold distance,
   a third zone between the second threshold distance and a third threshold distance farther from the magnetometer sensor than the second threshold distance, and
   a fourth zone beyond the third threshold distance and extending away from the magnetometer sensor.

5. The method of claim 1, wherein the determining the strength of the magnetic field further comprises adjusting, based on a geomagnetic field, the determination of the strength of the magnetic field.

6. The method of claim 1, wherein the feedback provided changes when the determined strength of the magnetic field from the magnet changes due to a change in a relative distance between the magnet and the magnetometer sensor.

7. The method of claim 4, wherein the providing feedback based on the determined strength of the magnetic field further comprises:
   causing the display screen to provide a first indication when the magnet in the first zone;
   causing the display screen to provide a second indication when the magnet is the second zone;
   causing the display screen to provide a third indication when the magnet in the third zone; and
   causing the display screen to provide a fourth indication when the magnet is in the fourth zone.

8. The method of claim 4, further comprising configuring a function of the opening sensor based on the determined strength of the magnetic field, including at least one of:
   enabling reporting a partial opening of an entry point when the magnet is in the first zone;
   enabling reporting a partial opening of the entry point when the magnet is in the second zone;
   disabling reporting a partial opening of the entry point when the magnet is in the third zone; and
   disabling reporting any opening of the entry point when the magnet is in the fourth zone.

9. A system, comprising:
   a magnetometer configured to detect a magnetic field of a magnet;
   a processor configured to:
     receive, from the magnetometer, data indicating a strength of the magnetic field, and
     determine, from the data, feedback indicating the strength of the magnetic field, wherein the feedback indicates more than two discrete ranges of distance between the magnet and the magnetometer; and
   a display screen configured to provide the feedback, wherein a first one of the indicated ranges of distance corresponds to saturation of the magnetometer by the magnetic field such that, if a distance between the magnet and the magnetometer is within the first range, the magnetometer is saturated.

10. The system of claim 9, wherein the display screen is a part of the magnetometer.

11. The system of claim 9, wherein the display screen is a part of at least one of:
    a separate computing device,
    a tablet computer,
    a smartphone,
    a smartwatch,
    a laptop computer,
    a desktop computer, or
    a combination thereof.

12. The system of claim 9, wherein the processor is configured to determine the strength of the magnetic field as corresponding to one of a plurality of zones.

13. The apparatus of claim 9, wherein the magnet is configured to be affixed to a stationary portion of an entry point and the magnetometer is configured to be affixed to a moving portion of an entry point.

14. The system of claim 12, wherein the plurality of zones comprises:
    a first zone between the magnetometer and a first threshold distance;
    a second zone between the first threshold distance and a second threshold distance farther from the magnetometer than the first threshold distance;
    a third zone between the second threshold distance and a third threshold distance farther from the magnetometer than the second threshold distance; and
    a fourth zone beyond the fourth threshold distance and extending away from the magnetometer.

15. The system of claim 14, wherein the processor is configured to provide, via the display screen:
    a first indication when the magnet in the first zone;
    a second indication when the magnet is the second zone;
    a third indication when the magnet in the third zone; and
    a fourth indication when the magnet is in the fourth zone.

16. The system of claim 14, wherein the processor is further configured to:
    enable reporting partial opening of an entry point when the magnet is in the first zone;

enable reporting partial opening of the entry point when the magnet is in the second zone;

disable, reporting partial opening of the entry point when the magnet is in the third zone; and disable reporting any opening of the entry point when the magnet is in the fourth zone.

17. A non-transitory computer-readable media storing instructions configured to cause a processor to perform operations comprising:

receiving, from a magnetometer, data indicating a strength of a magnetic field;

determining, from the data, feedback indicating the strength of the magnetic field, wherein the feedback indicates one of more than two discrete ranges of distance between the magnet and the magnetometer; and outputting the feedback to a display screen, wherein a first one of the indicated ranges of distance corresponds to saturation of the magnetometer sensor by the magnetic field such that, if a distance between the magnet and the magnetometer sensor is within the first range, the magnetometer sensor is saturated.

18. The non-transitory computer-readable media of claim 17, wherein the feedback further comprises:

causing the display screen to provide a first indication when the magnet in a first zone between the magnetometer and a first threshold distance;

causing the display screen to provide a second indication when the magnet is a second zone between the first threshold distance and a second threshold distance farther from the magnetometer than the first threshold distance;

causing the display screen to provide a third indication when the magnet in a third zone between the second threshold distance and a third threshold distance farther from the magnetometer than the second threshold distance; and causing the display screen to provide a fourth indication when the magnet is in a fourth zone beyond the third threshold distance and extending away from the magnetometer.

19. The non-transitory computer-readable media of claim 17, wherein the operations further comprise adjusting, based on a geomagnetic field, the feedback.

20. The non-transitory computer-readable media of claim 17, wherein the operations further comprise changing the feedback when the data indicating the strength of the magnetic field changes due to a change in a relative distance between a magnet and the magnetometer.

* * * * *